(12) United States Patent
Teplinsky et al.

(10) Patent No.: US 11,475,187 B2
(45) Date of Patent: Oct. 18, 2022

(54) AUGMENTED RELIABILITY MODELS FOR DESIGN AND MANUFACTURING

(71) Applicants: Optimal Plus Ltd., Holon (IL); ANSYS Inc., Canonsburg, PA (US)

(72) Inventors: Shaul Teplinsky, San Francisco, CA (US); Dan Sebban, Rishon LeZion (IL); Craig Hillman, Bethesda, MD (US); Ashok Alagappan, Chantilly, VA (US)

(73) Assignees: OPTIMAL PLUS LTD., Holon (IL); ANSYS INC., Canonsburg, PA (US)

( * ) Notice: Subject to any disclaimer, the term of this patent is extended or adjusted under 35 U.S.C. 154(b) by 337 days.

(21) Appl. No.: 16/826,147

(22) Filed: Mar. 20, 2020

(65) Prior Publication Data

US 2020/0302100 A1 Sep. 24, 2020

Related U.S. Application Data

(60) Provisional application No. 62/822,306, filed on Mar. 22, 2019.

(51) Int. Cl.
*G06F 30/27* (2020.01)
*G06N 20/00* (2019.01)
*G06F 119/02* (2020.01)

(52) U.S. Cl.
CPC ............ *G06F 30/27* (2020.01); *G06N 20/00* (2019.01); *G06F 2119/02* (2020.01)

(58) Field of Classification Search
USPC ......................................................... 702/182
See application file for complete search history.

(56) References Cited

U.S. PATENT DOCUMENTS

2018/0300576 A1* 10/2018 Dalyac ................ G06V 10/255

* cited by examiner

*Primary Examiner* — Bryce M Aisaka
(74) *Attorney, Agent, or Firm* — Kilpatrick Townsend & Stockton LLP

(57) ABSTRACT

A method for generating an augmented reliability performance model for a product includes obtaining a reliability performance model for the product, developing a reliability prediction machine learning model for predicting reliability performance of the product based on data obtained from manufacturing and testing of the product, and obtaining, from development of the machine learning model, feature names for the machine learning model and their predictive power values. The feature names may correspond to features from the data obtained from manufacturing and testing of the product. The method may further include extracting a set of feature names corresponding to features having highest predictive power values from the feature names, and generating the augmented reliability performance model for the product by modifying the reliability performance model to incorporate model parameters derived from the set of feature names.

20 Claims, 6 Drawing Sheets

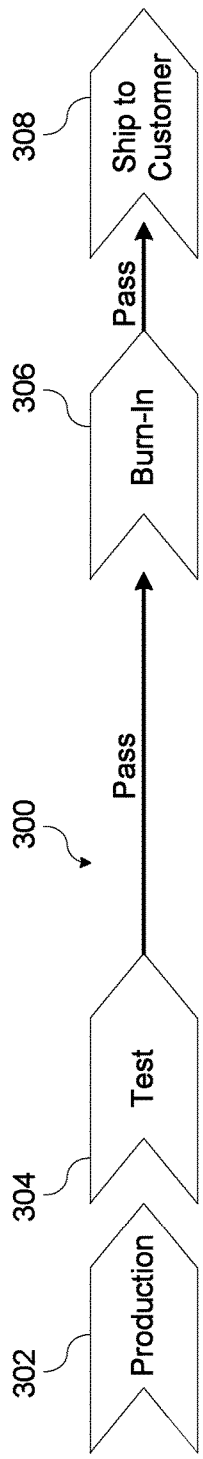
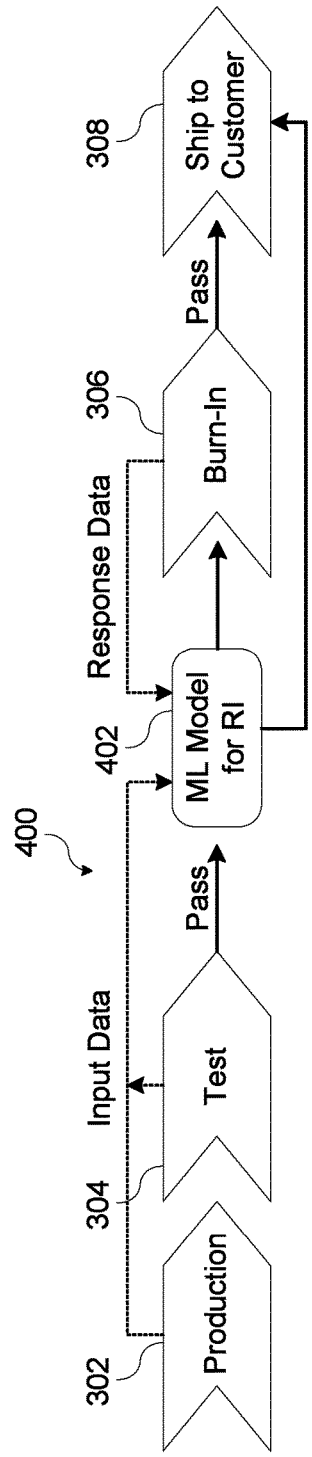
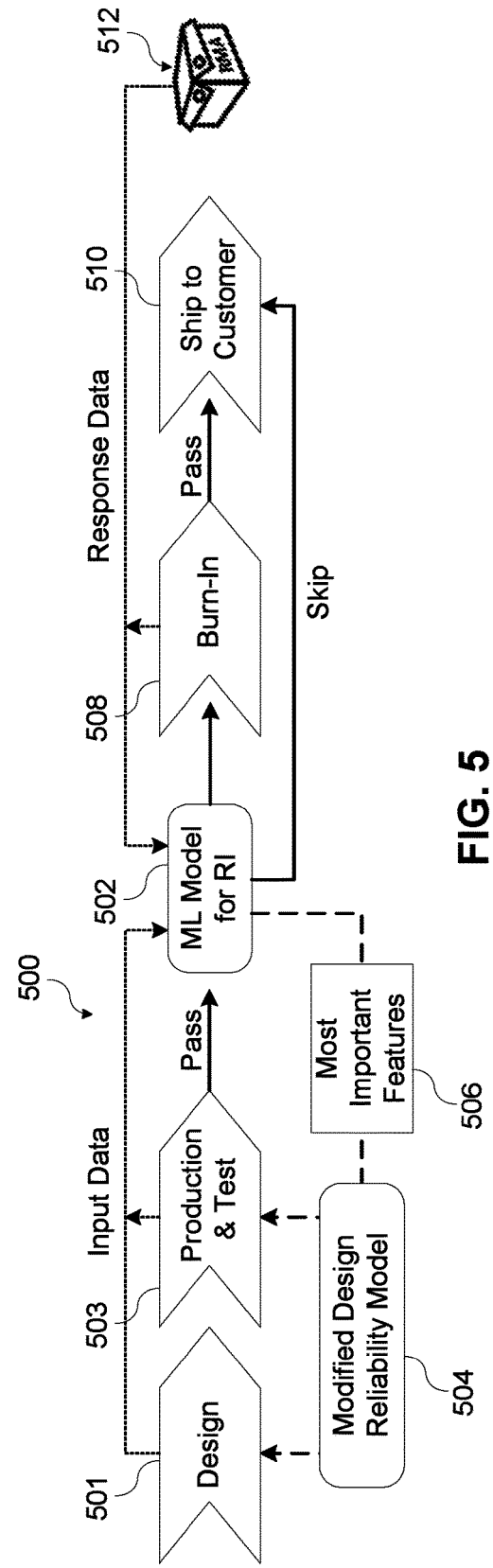

AUGMENTED RELIABILITY MODELS FOR DESIGN AND MANUFACTURING

CROSS REFERENCES TO RELATED APPLICATIONS

This application claims priority to U.S. Provisional Patent Application No. 62/822,306, filed Mar. 22, 2019, the disclosure of which is hereby incorporated by reference in its entirety for all purposes.

BACKGROUND

Products manufactured from the same process and according to the same process specifications should have the same manufacturing data. However, some products may have different manufacturing data from other products due to process manufacturing variations, even though the products were manufactured by the same process, under the same specifications, and passed all quality and reliability tests. Thus, some products may still fail or underperform in the field. Field failure data can be used to identify these occurrences.

Field failure data, and in some cases reliability testing data, as well as manufacturing data from high volume manufacturing can be used to identify a reliability performance model for products after they have been manufactured. The reliability performance model can be determined from use cases in the field, from reliability testing and from manufacturing data. The reliability performance model may be more practical in nature, compared to a theoretical reliability model used during the product and process design phases which is theoretical in nature. Historically, at least some manufacturing data, especially in early production stages, may be analyzed to build better theoretical models. But those data sets are too small and typically do not include enough reliability failures for proper modeling. The theoretical prediction of the reliability of the product may not match the practical reliability of the product after it is manufactured in high quantities and when it is used in the field. Conventionally, theoretical reliability models do not take into account practical test and in-use data from reliability performance models.

SUMMARY

Methods and systems for generating reliability models for design and manufacturing are provided.

According to some aspects there is provided a method for generating an augmented reliability performance model for a product. In some aspects, the method may include obtaining a reliability performance model for the product, developing a reliability prediction machine learning model for predicting reliability performance of the product based on data obtained from manufacturing and testing of the product, and obtaining, from development of the machine learning model, feature names for the machine learning model and their predictive power values. The feature names may correspond to features from the data obtained from manufacturing and testing of the product. The method may further include extracting a set of feature names corresponding to features having highest predictive power values from the feature names, and generating the augmented reliability performance model for the product by modifying the reliability performance model to incorporate model parameters derived from the set of feature names.

According to some aspects there is provided a method for designing a product. In some aspects, the method may include obtaining a design reliability model for the product. Obtaining the design reliability model may include, developing a reliability prediction machine learning model for predicting reliability performance of the product based on data obtained from manufacturing and testing of the product, and obtaining, from development of the machine learning model, feature names for the machine learning model and their predictive power. The feature names may correspond to features from the data obtained from manufacturing and testing of the product. The method may further include extracting a set of feature names corresponding to the features having highest predictive power from the feature names, modifying a reliability performance model by incorporating one or more model parameters derived from the set of feature names to generate the design reliability model for the product, and utilizing the design reliability model for at least one of design of the product and design of a process for manufacturing the product

BRIEF DESCRIPTION OF THE DRAWINGS

Aspects and features of the various embodiments will be more apparent by describing examples with reference to the accompanying drawings, in which:

FIG. 3 is a flow diagram of a process for manufacturing a product without using reliability models;

FIG. 4 is a flow diagram of a process for manufacturing a product using a reliability performance model;

FIG. 5 is a flow diagram of a process for manufacturing a product using a reliability performance model and a design reliability model according to some aspects of the present disclosure;

DETAILED DESCRIPTION OF SPECIFIC EMBODIMENTS

Embodiments of the present disclosure provide a method of determining and using reliability models for improved design and manufacture of products. Design for Reliability (DfR) is a process that encompasses tools and procedures to ensure that a product meets its reliability requirements, under its use environment, for the duration of its lifetime. DfR is implemented in the design stage of a product to proactively improve product reliability. This predicted reliability can be used by the designers to modify their product and/or process designs. A reliability performance model may be primarily theoretical in nature and can be derived from material science and device theory understood from a science and physics perspective.

Figure 1:
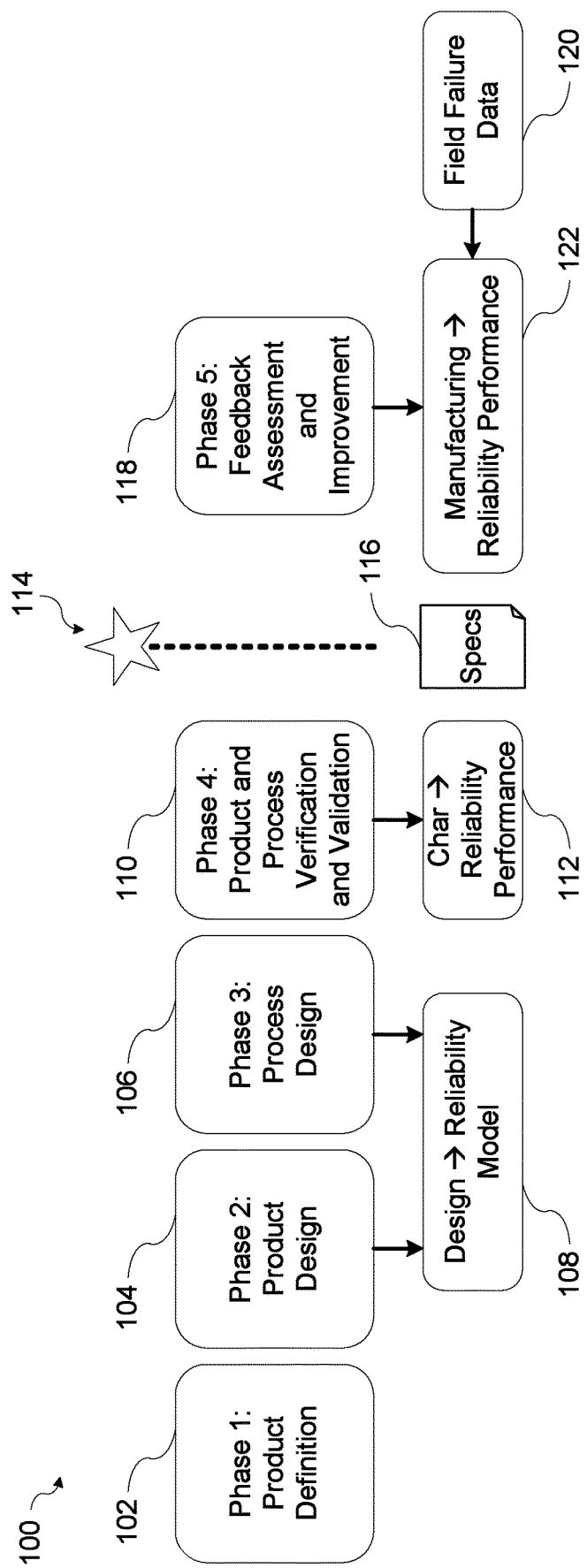
FIG. 1 is a process diagram illustrating a method for manufacturing a product.

FIG. 1 is a process diagram illustrating a method 100 for manufacturing a product. At block 102, a product can be defined. For instance, various functionality that a product is intended to achieve can be used to design a specific product, e.g., a graphics processor, central processing unit, memory device, motherboard, touch-screen display, smart phone, smart watch, computer, tablet, notebook, automobile, airplane, suspension systems, engines, construction tools, or any other product.

At block 104, the product can be designed. For instance, the different components of a product that work together to achieve the desired functionality can be created. For semiconductor device products, as an example, logic gates, transistors, amplifiers, power converters, and the like can be designed, along with how they will interact with one another. Once the product is designed, the process for manufacturing the product can be designed at block 106. Continuing with the semiconductor device example, the different process steps, e.g., deposition, etch, photolithography, and the like, can be designed to construct the semiconductor device. In some embodiments, the product and process flows are designed by teams of designers that have specialized knowledge in product and process design. To help these designers achieve a design and process that results in a reliable product, a design reliability model 108 may be used to predict how reliable the proposed design will be after its manufacture.

Thereafter, at block 110, the product and process designs can be verified and validated to ensure that the product design results in a product that can perform the intended functionality, and that the process design results in a high quality manufactured product. The verification of the product and process design can result in the generation of predicted reliability and performance data 112 that can predict, to a certain degree, how reliable the manufactured product will be and how well the product will perform the desired functionality.

Once verification and validation is complete, the product can then be manufactured 114, e.g., mass produced according to specifications 116. At block 118, feedback, assessment, and improvement of the product can be performed. As an example, manufacturing data can be gathered during high-volume manufacturing (e.g., thousands, hundreds of thousands, etc. of units) of the product and/or after the product has been manufactured but before shipping to the customer, and feedback can be received after the product is shipped to the customer.

High-volume manufacturing data can be gathered at various steps along the manufacturing process. Data may be gathered during construction of the product, e.g., data regarding thicknesses of semiconductor layers, dopant concentrations, alignments between layers, and the like for semiconductor products. Data may be gathered after the product has been manufactured, but before it has been approved for shipping to the customer, e.g., during final test, burn-in, etc. Manufacturing data may include, but is not limited to, processing data generated by fabrication equipment involved in the physical construction ("fabrication") of a component, test data generated by testing equipment involved in testing of a component, data generated during rework in fabrication, historical or transactional data generated based on operational information contained in manufacturing execution system (MES) databases and related to history of the manufacturing that is being performed, data generated by a factory information system (FIS), etc. As used herein, the terms manufacturing equipment or equipment may refer to fabrication equipment or testing equipment or both.

In some examples, manufacturing data may include logistical data collected by or from MES through the manufacturing flow(s), physical measurements taken during component fabrication phase, during assembly packaging, during PC board manufacturing, etc., fabrication data generated by fabrication equipment, testing data, manufacturing equipment maintenance data, monitor data, etc.

Products manufactured from the same process and according to the same process specifications should have the same manufacturing data. However, some products may have different manufacturing data from other products due to small process manufacturing variations, even though the products were manufactured by the same process, under the same specifications, and passed all of the quality and reliability tests. Thus, some products may still fail or underperform in the field. Accordingly, field failure data 120 can be used to identify these occurrences. The field failure data 120 can be tracked to identify improvements to the design and manufacturing process of the product.

Field failure data and/or reliability testing data 120 and high-volume manufacturing data can be used to identify a reliability performance data 122 for products after they have been manufactured. The reliability performance data 122 can be determined from use cases in the field and from reliability testing during manufacturing. The theoretical prediction of the reliability of the product may not match the actual reliability of the product after manufacturing and when it is used in the field.

According to some embodiments of the present disclosure, characteristics of a product and its manufacturing process that play a significant role in the product's reliability in the field can be identified by a reliability performance model. The characteristics may become features that can then be provided to a design reliability model, which can be configured to improve its sensitivity to those identified features. The design reliability model can also be configured to determine specific design parameters that are associated with the identified features and pass those design parameters to the design teams so that that the product and process designs can be improved in addition to improvements to product manufacturing. The critical features from the reliability performance model can augment the design reliability model and improve the ability of the design reliability model to predict the reliability of a manufactured product during the product and process design stage.

This unique approach of refining reliability performance models using most important features, also referred to as critical factors, that are representative of the product of interest can have the added benefits of providing a more accurate lifetime reliability prediction for product under field conditions. The more accurate lifetime reliability prediction provides a significant advantage across the supply chain in the product development flow, both upstream and downstream, in comparison to the conventional approach. In the conventional approach, different steps are performed discreetly with no feedback loop to provide insights to the key stakeholders; customers requiring accurate predictions for high reliability applications and design engineering teams requiring feedback from field performance to optimize newer designs. The approach described in the present disclosure can enable a feedback loop to be created to perform design optimization required for the new products to be designed and released with the process technology.

Figure 2:
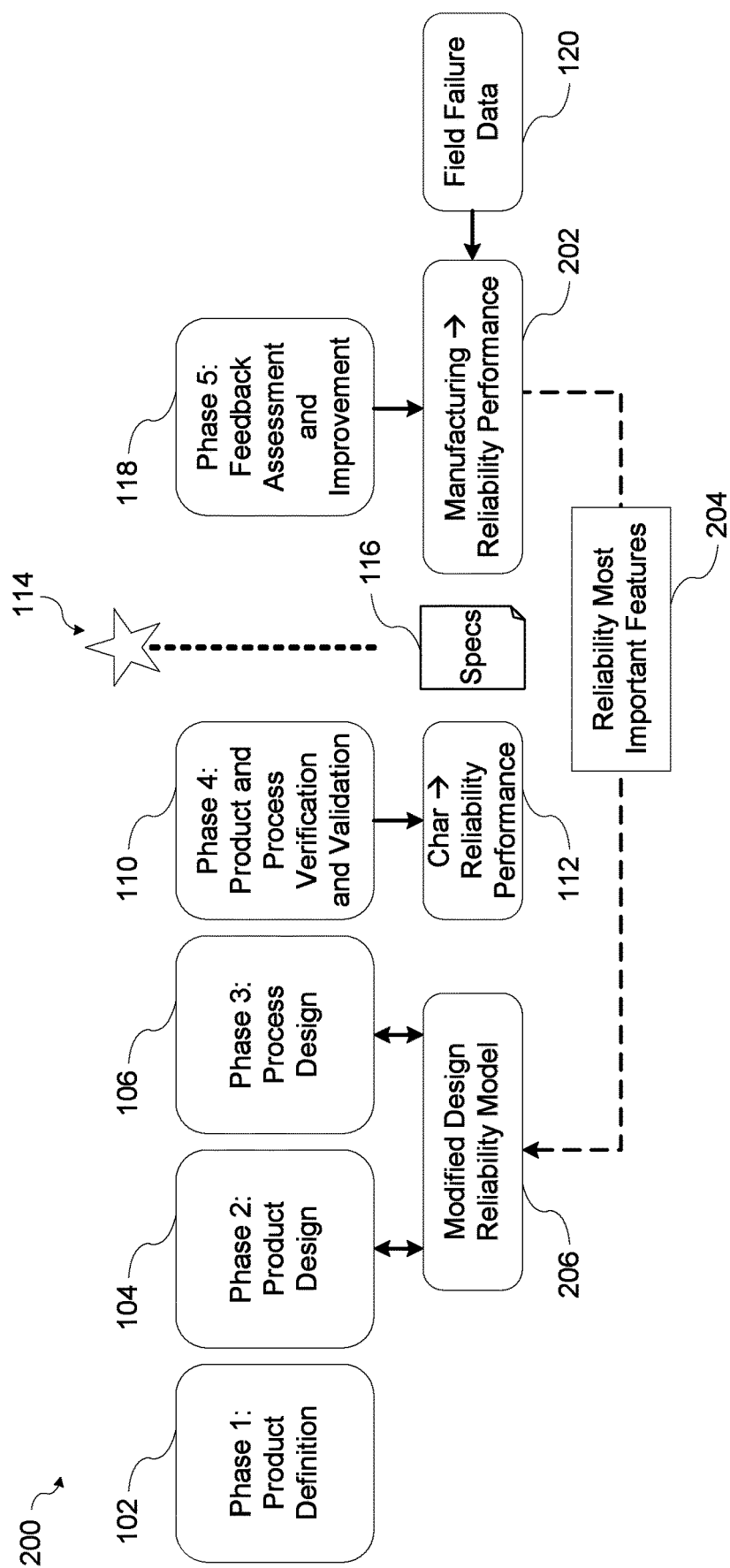
FIG. 2 is a process diagram illustrating a method for creating a product according to some aspects of the present disclosure.

FIG. 2 is a process diagram illustrating a method 200 for creating a product according to some aspects of the present disclosure. Referring to FIG. 2, the method may include a reliability performance data 202 and a modified design reliability model 206. As used herein, the term "modified design reliability model" may be used to refer to the design reliability model enhanced or augmented by the addition of the critical parameters. The reliability performance data 202 may be configured to identify one or more features 204 of a product and provide the one or more features 204 of the product to the modified design reliability model 206 for improving product and process design. In some embodiments, the reliability performance data 202 may be configured to use high-volume manufacturing data (e.g., feedback, assessment, and improvement data) from block 118 and field failure data 120 to identify features 204 of a product that impact the reliability of the product. Some example features include, but are not limited to, operating voltages, currents, resistances, processing speeds, and the like. Features 204 can be ranked according to the degree of impact on the reliability of the product, and features above an impact threshold can be used to improve the design reliability model during the design phase. For example, the features 204 can be used to create the modified design reliability model 206.

The modified design reliability model 206 can be configured to be sensitive to features 204 to predict the reliability of the product during the design phase. Additionally, the modified design reliability model 206 can be configured to identify one or more design parameters based on the features 204 that that may be identified to be accounted for during product design (e.g., at block 104) and/or process design (e.g., at block 110). Some example design parameters include, but are not limited to, threshold voltages for power transistors, gate dimensions, trace widths, target resistances, and the like for semiconductor devices. Thus, according to some embodiments of the present disclosure, the practical reliability of the product based on manufacturing data and/or field failure data 120 can be used to augment the design process by creating and using the modified design reliability model 206.

To better understand how design reliability and reliability performance models disclosed herein can improve product design, process design, and high-volume product manufacturing, various product manufacturing flows are described FIGS. 3-5.

FIG. 3 is a flow diagram of a process 300 for manufacturing a product without using reliability models. At block 302, a product can be produced, meaning the product can be manufactured (e.g., 114 in FIG. 1). At block 304, the product can be tested. For example, the basic operation of the product can be tested to determine whether it operates according to a set of specifications. Products that do not operate according to specifications can be grouped (e.g., binned) with other failing product and not be further tested. Products that do operate according to specifications can be passed and proceed to burn-in at block 306. Burn-in can be any suitable stress test, such as a temperature stress test, cycling stress test, and the like, designed to separate out inferior products. Once the products pass burn-in, at block 308, the products can be shipped to the customer. As can be understood from FIG. 3, the process 300 sends all passing products to burn-in, which can be costly and time consuming. Thus, performing burn-in on products that will likely pass or fail burn-in may be unnecessarily costly and may not have an impact on product reliability. Some processes may improve the cost effectiveness of the manufacturing process, for example, as discussed with respect to FIG. 4.

FIG. 4 is a flow diagram of a process 400 for manufacturing a product using a Machine Learning (ML) model for reliability index prediction 402. As shown in FIG. 4, the ML model 402 can receive input data from production (e.g., at block 302) and test (e.g., at block 304). The ML model 402 may output a reliability index prediction. Some exemplary input data for the ML model 402 can include high-volume manufacturing data discussed herein with respect to FIG. 1. The ML model 402 can also receive response data from burn-in (e.g., at block 306). Response data can include information about which products fail burn-in to enable the ML model 402 to correlate manufacturing data with those products to identify which manufacturing data may have an impact on burn-in fail rates.

In addition, response data can include information about which products pass burn-in above expectation so that the ML model 402 can correlate manufacturing data with those products to identify which manufacturing data have an impact on burn-in pass rates. With this information, the ML model 402 can cause certain products that have not yet been through the burn-in process to skip the burn-in process entirely or in part, to save cost without impacting the reliability of the resulting manufactured products. Although the process 400 may improve the cost effectiveness of the burn-in process, it may not improve the product design or the process design processes. Some methods improve the product design, process design, and cost effectiveness of the manufacturing process, as discussed with respect to FIG. 5.

FIG. 5 is a flow diagram of a process 500 for manufacturing a product using a Machine Learning (ML) model for reliability index prediction model 502 and a modified, or augmented, reliability performance model 504 according to some aspects of the present disclosure. Referring to FIG. 5, at block 501, a product can be designed, where designing the product may encompass product definition (e.g., block 102 in FIG. 1), product design (e.g., block 104 in FIG. 1), process design (e.g., block 106 in FIG. 1), and verification and validation of the product design and manufacturing process (e.g., block 110 in FIG. 1).

At block 503, the product can be manufactured (e.g., 114 in FIG. 1) and tested to determine whether it is working according to a set of specifications. The ML model 502 can receive input data from manufacturing and testing (e.g., at block 503), as well as from the design process (e.g., at block 501). Additionally, the ML model 502 can receive response data from burn-in (e.g., at block 508) and field use data 512. According to some embodiments of the present disclosure, ML model 502 can use the input data and response data to identify features 506 of the product that impact its reliability in the field, e.g., when it is used by customers. The features 506 can be fed back to the modified design reliability model 504 to configure the augmented reliability performance model 504 to be sensitive to the features 506, as well as to identify design parameters that are associated with the features 506.

The design parameters can be passed to the designers of the product and the process of making the product via the augmented reliability performance model, also referred to herein a a design reliability model, so that the product design and process design can be improved. As a result, the products that are manufactured according to the process 500 may be more reliable than products manufactured according to the processes 300 and 400. The process 500 may also increase cost-effectiveness and reduce waste.

Figure 6:
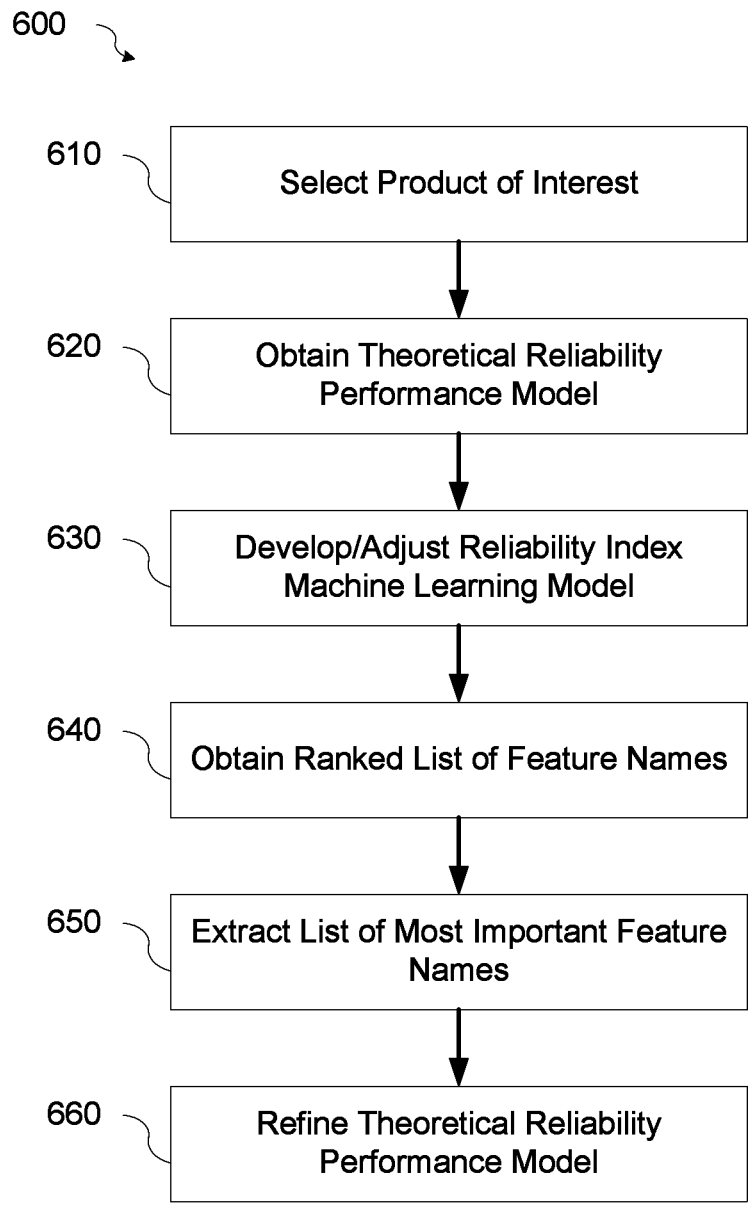
FIG. 6 is a flowchart illustrating an example of a method for generating a design reliability model according to some aspects of the present disclosure.

FIG. 6 is a flowchart illustrating an example of a method for generating a design reliability model according to some aspects of the present disclosure. Referring to FIG. 6, at block 610, a product of interest may be selected. For example, the product of interest may be a semiconductor device for which reliability testing data are available. The product of interest can be defined by selecting a distinct product name from a list of available product names in a database, and for which historical manufacturing performance and reliability data are available on a per-part basis (e.g., for each part that was manufactured).

At block 620, the theoretical reliability performance model may be obtained. For the product of interest, the theoretical reliability performance model may be obtained from generic models published in industry standards or from a collection of models developed for the product. The theoretical reliability performance model makes assumptions about the electrical characteristics of the product of interest such as operating voltages and frequencies. The assumptions are made at a level of abstraction higher than a functional block level or critical path of the product likely to cause failures. Actual feature sizes of the product such as length, width, area, and capacitance of the metal lines that could be derived from the product are not included in the theoretical reliability model. For example, a generic theoretical reliability performance model for electromigration may take into account product level voltages, frequencies, temperatures, materials properties, etc., to define the theoretical performance of the product. In some cases, the theoretical model may include some parameters such as feature sizes, etc., but the included parameters may be inaccurate (e.g., may not reflect actual feature sizes), or may not be correctly utilized in the model (e.g., may be given too much or too little weight).

At block 630, a Machine Learning (ML) model for reliability index prediction may be developed. The ML model may connect the in-line monitors, machine sensors, and the test data as input for reliability index ML model to the reliability performance prediction (e.g., reliability index) output from the model. A reliability index is a measure of the ability of a product to perform as expected. The reliability index ML model can enable subsequent prediction of the reliability performance of future parts based on their input for model. Input for the model may be analyzed until a prediction within specified limits can be made to create a new model or adjust an existing one. The model may be, for example, but not limited to, a random forest classifier or a different type of machine learning algorithm.

The historical manufacturing performance for each part (e.g., each manufactured unit) of the product of interest that was manufactured may be obtained. A part is a manufactured unit, such as a single semiconductor device die, that can be identified and can be attributed with historical manufacturing performance data, test data, and reliability performance data. The product data may include, but is not limited to, fabrication data (e.g., in-line monitors and machine sensors, etc.), test data, actual reliability performance data such as reliability stress and/or customer return pass/fail information, etc., for each part of the selected product.

Fabrication data may include data from various domains such as in-line monitors and machine sensors. In-line monitors are measurements, such as defect metrology at various process steps, critical dimension measurements, lithography alignment, etc., performed on the parts that are being fabricated. Machine sensors are data (e.g., temperature, pressure, acidity, etc.) measured on the manufacturing tools, such as lithography steppers, etchers, etc., during the actual fabrication processes involved in fabricating the parts, as well as additional machine-related data such as periods passed from last maintenance, volumes of processed material, etc.

Test data is the data collected during the testing of the parts. Test data may include data generated during wafer sort steps, final test steps, and electrical test, both in-line and end-of-line electrical test, as well as additional electrical testing.

Reliability performance data can relate to the results of accelerated stress testing performed on the parts, such as burn-in, Highly Accelerated Temperature/Humidity Stress Testing (HAST), electromigration, etc., as well as field performance data that can be derived from customer returns or from built-in self-test (BIST) of the product. The data described above may be extracted from manufacturing, testing, and reliability databases for each part of the product of interest. In an example case where the reliability performance data is related to electromigration, a subset of the relevant manufacturing data is shown in Table 1.

TABLE 1

| Fab Process Variable | Representative Parameter |
|---|---|
| Resistance of metal lines for worst case/critical region of live die/module/structures | Metal capacitance from parametric/electrical test measurements |
| Area of different metal layers for worst case/critical region of live die/module/structures | Length/Width/Critical Dimension parameters from metrology data |
| Current density of metal lines | Combination of various measurements |
| Dishing depth of metal wires for worst case/critical region of live die/module/structures | Chemical Mechanical Planarization (CMP) dishing from metrology data |
| Capacitance of different metal lines for worst case/critical region of live die/module/structures | Metal capacitance from parametric/electrical test measurements |

At block 640, ranked feature names may be obtained from the metadata of the reliability index ML model. As a result of developing the ML model, a portion of the metadata generated by the model may be a ranking of the feature names corresponding to features (e.g., manufacturing and test data) according to their predictive power. Predictive power may be a measure of how predictive a feature is against reliability performance. Table 2 illustrates an example of a list of the feature names from Table 1 ranked according to predictive power of their corresponding features.

TABLE 2

| Importance | Fab Process Variable | Representative Parameter |
|---|---|---|
| 1 | Area of different metal layers for worst case/critical region of live die/module/structures | Length/Width/Critical Dimension parameters from metrology |
| 2 | Capacitance of different metal lines for worst case/critical region of live die/module/structures | Metal capacitance from parametric/electrical test measurements |
| 3 | Resistance of metal lines for worst case/critical region of live die/module/structures | Metal capacitance from parametric/electrical test measurements |
| 4 | Current density of metal lines | Combination of various measurements |

TABLE 2-continued

| Importance | Fab Process Variable | Representative Parameter |
| --- | --- | --- |
| 5 | Dishing depth of metal wires for worst case/critical region of live die/module/structures | Chemical Mechanical Planarization (CMP) dishing from metrology data |

In Table 2, predictive power the column labeled Fab Process Variable may indicate the feature name corresponding to a feature for the model. A feature in the machine learning context is an input to the model. For example, defect metrology measurements at a single measuring layer, or an average temperature during a certain fabrication process can be considered as features. The reliability index ML model may be constructed in such a way that shows the predictive power of each feature name corresponding to features that are input to the model. Column 1 labeled Importance shows the ranking of the feature names according to the predictive power of their corresponding features as determined by the model. The Representative Parameter column provides physical examples of parameters that may be descriptive of the feature names.

At block 650, a set of most important feature names may be extracted from the ranked feature names. Not all features will have similar predictive power for the model. The feature names corresponding to features having the highest predictive power may be determined as the most important feature names. For example, a predictive power threshold value may be determined. The threshold may be determined by statistical methods or empirical methods (e.g., a predetermined number of high ranking feature names). Feature names corresponding to features having predictive power values that exceed the threshold value may be extracted from the ranked list of feature names as the list of most important feature names.

Table 3 illustrates the highest-ranking feature names from Table 2 that may be selected as list of most important feature names having the highest predictive power for the model.

TABLE 3

| Importance | Fab Process Variable | Representative Parameter |
| --- | --- | --- |
| 1 | Area of different metal layers for worst case/critical region of live die/module/structures | Length/Width/Critical Dimension parameters from metrology |
| 2 | Capacitance of different metal lines for worst case/critical region of live die/module/structures | Metal capacitance from parametric/electrical test measurements |
| 3 | Resistance of metal lines for worst case/critical region of live die/module/structures | Metal capacitance from parametric/electrical test measurements |

It should be noted that the example list of features in Table 3 is not the output of the model. The output of the reliability index ML model would be the reliability index prediction if the model were executed. Embodiments according to the present disclosure do not execute the model. The list of feature names may be extracted from metadata that provides information to aid in interpreting the reliability index prediction results of the model and is generated during development of the model.

The reliability performance of manufactured parts may also be improved by management of the extracted most important feature names. During manufacturing, tighter process management may be reflected, for example, by setting a different value that the fabrication processes should attain in accordance with the values suggested by the feature names extracted from the metadata of the ML model, or controlling the fabrication processes more tightly in order to decrease the process variation. Each approach may require adjusting the engineering process parameters, different maintenance schedules, etc.

At block 660, the theoretical reliability performance model may be refined (e.g., augmented) based on the list of most important feature names to generate the augmented reliability performance model, also referred to herein as the design reliability model. For example, a semiconductor fabrication process provides a large amount of data from the manufacturing flow in the form of, for example, but not limited to, feature size measurements (referred to as metrology), electrical test data from parametric structures which are representative of the critical performance characteristics of the actual product, electrical functional test data from the actual product itself, etc. The feature names corresponding to the features determined to have the highest predictive power on the reliability index prediction of the model (e.g., the most important features) may be used to modify the theoretical reliability performance model. The most important feature names may be translated into one or more design parameters that are incorporated into the augmented reliability performance model. The reliability performance model may be modified by adding one or more new model parameters based on the list of most important feature names. Alternatively, the reliability performance model may be modified by modifying one or more existing model parameters based on information derived from the list of most important feature names. In some implementations, feature names corresponding to the features determined to have the lowest predictive power on the reliability index prediction of the model may be removed from the model.

As an example, electromigration is an intrinsic failure mechanism resulting in open circuits or short circuits of metal lines in a semiconductor device due to excessive current flow above the rated design. Electromigration is dependent on the critical current density of the metal lines across a critical length and the temperature rise of the metal lines due to joule heating. On a semiconductor device product, there can be from two to fifteen levels of metal lines being used as interconnects to transmit input, output, and power signals throughout the product.

The level of finer granularity of the product can be obtained by gaining insight into the manufacturing flow, gathering and datamining the large amount of data being generated during high volume manufacturing and testing, and using appropriate descriptive characteristics of the actual product. For example, current density of the metal lines can be represented as a function of current passing through a certain critical cross section area of the metal lines.

Conventionally, design engineering obtains reliability models from the manufacturing foundry to validate a design against the process technology. These models can be legacy models for the process technology by which the product will be manufactured, or generic models based on industry standards. The conventional reliability models do not account for the critical parameters described above which are representative of the product of interest. The feature names identified from the list of most important features may be translated into design parameters usable by design teams during the product and process design stages. For example, personnel (e.g., reliability engineers or other product experts) knowledgeable in relating the identified feature names to design requirements may formulate the design parameters. In some cases, expert systems may be designed to provide the translation of the identified features to design parameters.

The translated design parameters may be incorporated into the design reliability model. The translated design parameters may be incorporated into the design reliability model by adding one or more new model parameters determined based on the list of most important feature names. Alternatively, the translated design parameters may be incorporated into the design reliability model by modifying one or more existing model parameters based on information derived from the list of most important feature names.

The presence of field failure data showing the occurrence of early field failures is an indication of the limitations of the ability of the theoretical model to provide realistic and accurate lifetime estimates. The design reliability model may present a robust approach in which critical features of the product that contribute to the marginality of a product and the factors that are conducive to field failures are taken into consideration by the model. This approach may provide higher accuracy in the prediction of field failures, and create an opportunity for design optimization enabling a plan of record (POR) for new designs to be released.

Releasing to a design team a design reliability model (augmented reliability performance model) that is representative of a specific product rather than a theoretical reliability performance model at a higher level of abstraction may enable design optimization resulting in higher reliability. For example, a theoretical model may address the operating conditions (e.g., voltage and current) for an entire product, as compared to the design reliability model that addresses the current density for different levels of critical metal lines present in the product.

The design reliability model may provide more accurate reliability lifetime estimates for customers using the products designed and manufactured within a certain process technology. This can provide more realistic prediction models that can identify mitigation techniques if the lifetime estimates do not meet the application requirements.

The design reliability model can provide a feedback loop for the design engineering team to optimize the design of newer products to be released with the process technology. Areas of improvement for newer designs may be identified and failures may be mitigated.

It should be appreciated that the specific steps illustrated in FIG. 6 provide a particular method for generating a design reliability model according to an embodiment of the present invention. Other sequences of steps may also be performed according to alternative embodiments. For example, alternative embodiments of the present invention may perform the steps outlined above in a different order. Moreover, the individual steps illustrated in FIG. 6 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 7:
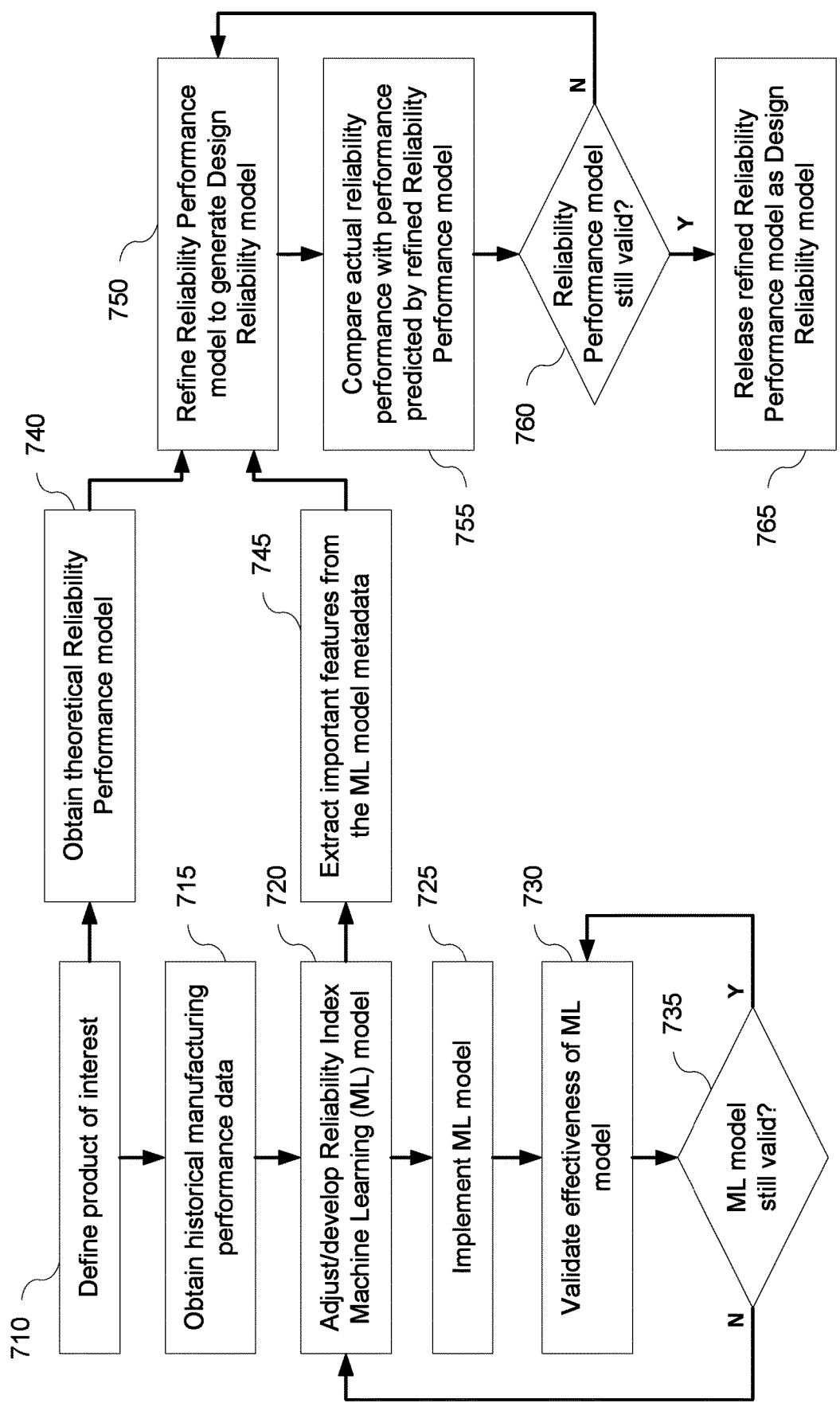
FIG. 7 is a flow diagram of an example of an overall process for generating a design reliability model generated according to some aspects of the present disclosure.

FIG. 7 is a flow diagram of an example of an overall process 700 for generating a design reliability model according to some aspects of the present disclosure. At block 710, a product of interest may be defined. The product of interest may be a semiconductor device for which reliability testing data are available. The product of interest can be defined by selecting a distinct product name from a list of available product names in a database, and for which historical manufacturing performance and reliability data are available on a per part basis (e.g., for each part that was manufactured).

At block 715, historical manufacturing performance data may be obtained. The historical manufacturing performance data may be obtained per each part of product of interest. The historical manufacturing performance data may include fabrication data (e.g., in-line monitors and machine sensors, etc.), and test data, as well as actual reliability performance (e.g., reliability stress and/or customer returns pass/fail information).

At block 720, a reliability index machine learning (ML) model may be adjusted if it exists or developed if it does not exist. The model and may be adjusted or developed to predict reliability performance for each part. The reliability index ML model may be executed with input for the model being the fabrication and test data. The output of the model may be a reliability performance prediction.

At block 725, the reliability index ML model may be implemented. The reliability index ML model may be implemented in the production environment, and may gather the reliability index for each part.

At block 730, the effectiveness of the reliability index ML model may be validated. The effectiveness of the model may be evaluated on new products as they are fabricated and tested.

At block 735, it may be determined whether the reliability index ML model is still valid. Using the results of the effectiveness evaluation, the validity reliability of the reliability index ML model may be determined.

In response to determining that the reliability index ML model is still valid (735-Y), the process may return to block 730 to continue using and validating the model. In response to determining that the reliability index ML model is not still valid (735-N), the process may return to block 720 to adjust the model.

After the product of interest is defined (block 710), at block 740, a theoretical reliability model may be obtained. The theoretical reliability performance may be obtained from generic models published in industry standards. The theoretical reliability model makes assumptions about the electrical characteristics of the product of interest such as operating voltages and frequencies. The assumptions are made at a level of abstraction higher than a functional block level or critical path of the product likely to cause failures.

After the reliability index ML model is executed (block 720), at block 745, the important features related to reliability may be extracted from the metadata of the reliability index ML model. The reliability index ML model may be constructed such that the metadata includes the impact of each input feature on the prediction of the model is shown. A ranked list of the features may be extracted from the metadata of the machine learning model.

The reliability performance of manufactured parts may also be improved by management of the extracted most important features during manufacturing. Tighter management may be reflected, for example, by setting a different value that the fabrication processes should attain in accordance with the values suggested by the features extracted from the metadata of the ML model, or controlling the fabrication processes more tightly in order to decrease the process variation. Each approach may require adjusting the engineering process parameters, different maintenance schedules, etc.

At block 750, the reliability performance model may be refined. The reliability performance model may be refined to account for the features of the ranked list of the features extracted from the metadata of the reliability index ML model. The extracted features may be representative of the critical performance characteristics of the actual product, and electrical functional and reliability test data from the actual product. The extracted features obtained from metadata of the reliability index ML model may be translated into design parameters for the refined reliability performance model that may be used to improve subsequent product designs.

At block 755, the actual reliability may be compared with the predicted reliability. The failure rate of the product may be computed using both the theoretical reliability performance model and the refined reliability performance model methods, and the results may be compared. For typical operating conditions of the product, the reliability analysis may be performed using the refined reliability performance model.

At block 760, it may be determined whether the refined reliability performance model is valid. The refined reliability performance model represents the reliability performance of the product for the fielded product. Reliability predictions from the refined reliability performance model may be compared against accelerated life tests and reliability tests performed on the product to determine the validity of the model.

In response to determining that the reliability performance model is not valid (760-N), the process may return to block 750 to refine the reliability performance model. In response to determining that the reliability performance model is valid (760-Y), at block 765, the refined reliability performance model may be released as the design reliability model.

Figure 8:
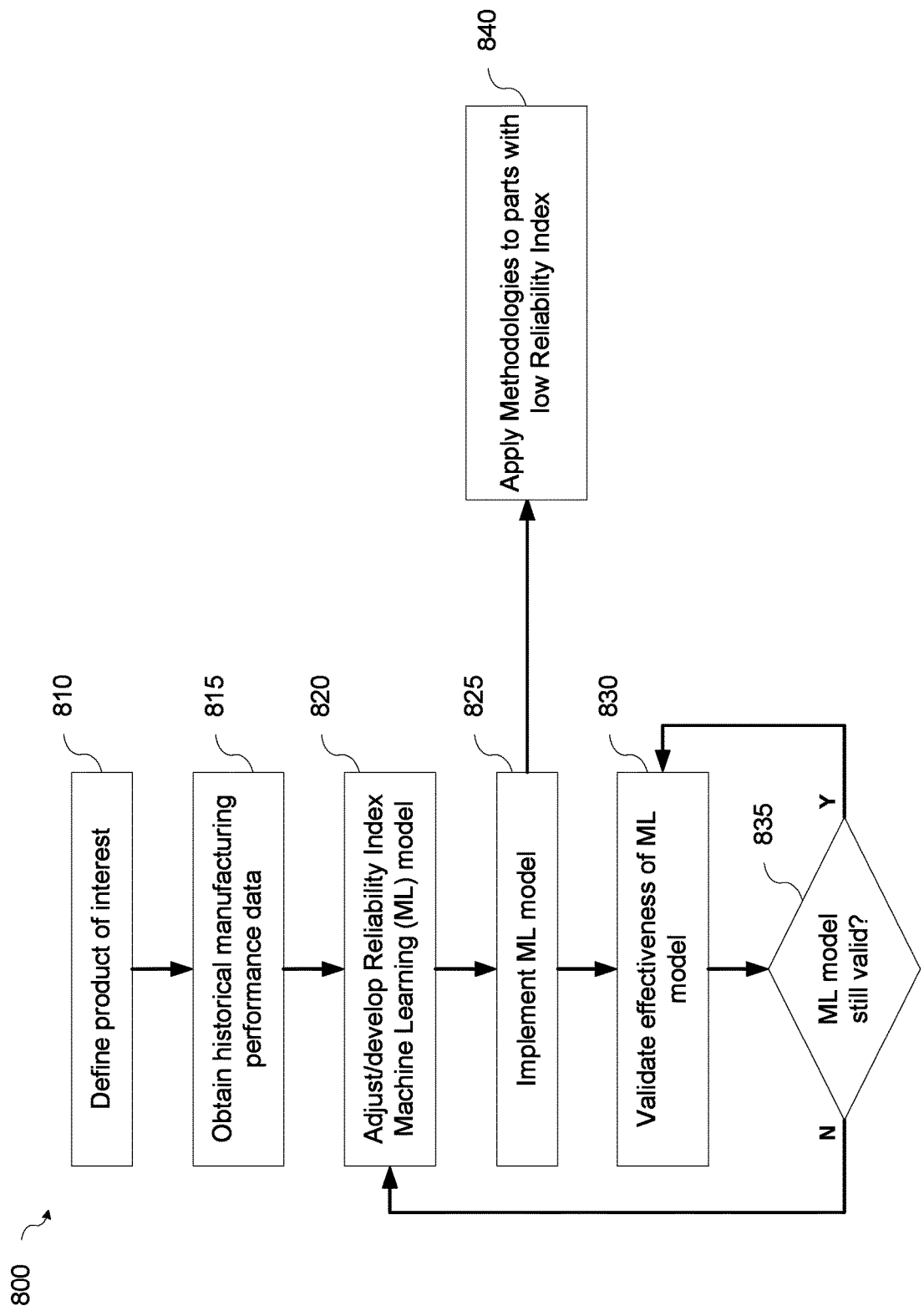
FIG. 8 is a flow diagram of an example of a process for identifying and mitigating potential failures of a product using a design reliability model generated according to some aspects of the present disclosure.

FIG. 8 is a flow diagram of an example of a process 800 for identifying and mitigating potential failures of a product using a performance reliability model generated according to some aspects of the present disclosure. At block 810, a product of interest may be defined. The product of interest may be a semiconductor device for which reliability testing data are available. The product of interest can be defined by selecting a distinct product name from a list of available product names in a database, and for which historical manufacturing performance and reliability data are available on a per part basis (e.g., for each part that was manufactured).

At block 815, historical manufacturing performance data may be obtained. The historical manufacturing performance data may be obtained per each part of product of interest. The historical manufacturing performance data may include fabrication data (e.g., in-line monitors and machine sensors, etc.), and test data, as well as actual reliability performance (e.g., reliability stress and/or customer returns pass/fail information).

At block 820, a reliability index machine learning (ML) model may be adjusted if it exists or developed if it does not exist. The model and may be adjusted or developed to predict reliability performance for each part. The reliability index ML model may be executed with input for the model being the fabrication and test data. Output of the model is a reliability performance prediction.

At block 825, the reliability index ML model may be implemented. The reliability index ML model may be implemented in the production environment, and may gather the reliability index for each part.

At block 840, after the reliability index ML model is implemented, various methodologies may be applied to parts determined to have a low reliability index. The methodologies applied may provide proactive steps to reduce part failures in the field. The various methodologies to be applied may be, for example, but not limited to, engineering disposition, additional test or screen, proactive review of actual field performance, higher frequency for maintenance, etc.

Parts that have been manufactured but not yet shipped for which the model predicts a low reliability index value can treated using of the following methodologies. Engineering disposition involving review by a product expert, e.g. a quality and reliability engineer, of the reasons due to which a part or a group of parts were assigned a low index value. The product expert can determine which of the features led to the low reliability index value, and decide whether the part should or should not be deemed passing the quality control requirements. In some cases, the outcome of the engineering disposition may be to subject the low index value devices to additional testing or screening, for example full-wafer E-Test or other reliability testing. The result of the additional testing can determine if the parts should be deemed passing the quality control requirements.

For parts that were already delivered to customers, a proactive review of actual field performance may be required. The proactive review may involve the analysis of usage parametric data in order to decide whether there is any degradation in the performance of the parts. Another approach may be to recommend higher than normal maintenance frequency or to exchange parts to prevent field failures.

At block 830, the effectiveness of the reliability index ML model the validated. The effectiveness of the model may be evaluated on new products as they are fabricated and tested.

At block 835, it may be determined whether the reliability index ML model is still valid. Using the results of the effectiveness evaluation, the validity reliability of the reliability index ML model may be determined.

In response to determining that the reliability index ML model is still valid (835-Y), the process may return to block 830 to continue using and validating the model. In response to determining that the reliability index ML model is not still valid (35-N), the process may return to block 820 to adjust the model.

It should be appreciated that while examples related to electronic product reliability have been provided, aspects of the present disclosure are applicable to general product design, fabrication, and testing processes without departing from the scope of the present disclosure.

The examples and embodiments described herein are for illustrative purposes only. Various modifications or changes in light thereof will be apparent to persons skilled in the art. These are to be included within the spirit and purview of this application, and the scope of the appended claims, which follow.

What is claimed is:

1. A method for generating an augmented reliability performance model for a product, the method comprising:
   obtaining a reliability performance model for the product;
   developing a reliability prediction machine learning model for predicting reliability performance of the product based on data obtained from manufacturing and testing of the product;
   obtaining, from development of the machine learning model, feature names for the machine learning model and their predictive power values, wherein the feature names correspond to features from the data obtained from manufacturing and testing of the product;
   extracting a set of feature names corresponding to features having highest predictive power values from the feature names; and generating the augmented reliability performance model for the product by modifying the reliability performance model to incorporate one or more model parameters derived from the set of feature names.

2. The method of claim 1, wherein extracting the set of feature names corresponding to the features having highest predictive power values comprises extracting one or more feature names corresponding to the features having predictive power values exceeding a threshold predictive power value.

3. The method of claim 1, wherein the feature names for the machine learning model comprise metadata of the machine learning model.

4. The method of claim 1, wherein extracting the set of feature names corresponding to the features having highest predictive power values comprises extracting a predetermined number of feature names.

5. The method of claim 1, wherein modifying the reliability performance model to incorporate model parameters derived from the set of feature names comprises adding one or more new model parameters derived from the set of feature names.

6. The method of claim 1, wherein modifying the reliability performance model to incorporate model parameters derived from the set of feature names comprises modifying one or more existing model parameters based on information derived from the set of feature names.

7. The method of claim 1, further comprising:
translating the set of feature names into one or more design parameters; and
incorporating the one or more design parameters into the augmented reliability performance model.

8. The method of claim 7, wherein incorporating the one or more design parameters into the augmented reliability performance model comprises adding one or more new model parameters to the augmented reliability performance model.

9. The method of claim 7, wherein incorporating the one or more design parameters into the augmented reliability performance model comprises modifying one or more existing parameters of the augmented reliability performance model.

10. The method of claim 1, further comprising:
extracting one or more feature names corresponding to features having lowest predictive power from the feature names; and
modifying the reliability performance model by removing one or more existing model parameters based on the one or more feature names to generate the augmented reliability performance model for the product.

11. A method for designing a product, the method comprising:
obtaining a design reliability model for the product, wherein obtaining the design reliability model comprises:
developing a reliability prediction machine learning model for predicting reliability performance of the product based on data obtained from manufacturing and testing of the product;
obtaining, from development of the machine learning model, feature names for the machine learning model and their predictive power values, wherein the feature names correspond to features from the data obtained from manufacturing and testing of the product;
extracting a set of feature names corresponding to the features having highest predictive power from the feature names; and
modifying a reliability performance model by incorporating one or more model parameters derived from the set of feature names to generate the design reliability model for the product; and
utilizing the design reliability model for at least one of design of the product and design of a process for manufacturing the product.

12. The method of claim 11, wherein extracting the set of feature names corresponding to the features having highest predictive power values comprises extracting one or more feature names having predictive power values exceeding a threshold predictive power value.

13. The method of claim 11, wherein the feature names for the machine learning model comprise metadata of the machine learning model.

14. The method of claim 11, wherein extracting the set of feature names corresponding to the features having highest predictive power values comprises extracting a predetermined number of feature names.

15. The method of claim 11, wherein modifying the reliability performance model to incorporate one or more model parameters derived from the set of feature names comprises adding one or more new model parameters derived from the set of feature names.

16. The method of claim 11, wherein modifying the reliability performance model to incorporate one or more model parameters derived from the set of feature names comprises modifying one or more existing model parameters based on information derived from the set of feature names.

17. The method of claim 11, further comprising:
translating the set of feature names into one or more design parameters; and
incorporating the one or more design parameters into the design reliability model.

18. The method of claim 17, wherein incorporating the one or more design parameters into the design reliability model comprises adding one or more new model parameters to the design reliability model.

19. The method of claim 17, wherein incorporating the one or more design parameters into the design reliability model comprises modifying one or more existing parameters of the design reliability model.

20. The method for claim 11, further comprising:
extracting one or more feature names corresponding to the features having lowest predictive power from the feature names; and
modifying the reliability performance model by removing one or more existing model parameters based on the one or more feature names to generate the design reliability model for the product.

* * * * *